(12) United States Patent
Haginoya et al.

(10) Patent No.: US 9,609,153 B2
(45) Date of Patent: Mar. 28, 2017

(54) PREVIEW IMAGE GENERATION FOR PRINTERS

(71) Applicants: Toshiyuki Haginoya, Tokyo (JP); Takao Suzuki, Tokyo (JP)

(72) Inventors: Toshiyuki Haginoya, Tokyo (JP); Takao Suzuki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/044,362

(22) Filed: Feb. 16, 2016

(65) Prior Publication Data
US 2016/0248919 A1   Aug. 25, 2016

(30) Foreign Application Priority Data
Feb. 25, 2015   (JP) ................... 2015-035823

(51) Int. Cl.
*G06F 3/12*   (2006.01)
*H04N 1/00*   (2006.01)

(52) U.S. Cl.
CPC ....... *H04N 1/0044* (2013.01); *H04N 1/00411* (2013.01)

(58) Field of Classification Search
CPC ............. H04N 1/00803; H04N 1/0032; H04N 1/0057; H04N 1/1061; H04N 2201/0094
USPC ..... 358/1.1, 1.9, 1.12, 1.13, 1.14, 1.15, 1.18
See application file for complete search history.

(56) References Cited

U.S. PATENT DOCUMENTS

| | | | |
|---|---|---|---|
| 8,913,278 B2 | 12/2014 | Tsunekawa | |
| 2004/0207859 A1* | 10/2004 | Kadoi | H04N 1/3873 358/1.1 |
| 2006/0066899 A1* | 3/2006 | Yoshida | G06F 3/1256 358/1.15 |
| 2008/0201378 A1 | 8/2008 | Nagahara et al. | |
| 2014/0078527 A1* | 3/2014 | Ono | G06F 3/1211 358/1.9 |
| 2014/0368878 A1* | 12/2014 | Asai | H04N 1/00408 358/1.15 |

FOREIGN PATENT DOCUMENTS

| | | |
|---|---|---|
| JP | 2006340220 A | 12/2006 |
| JP | 2008205903 A | 9/2008 |
| JP | 2013-162422 | 8/2013 |
| JP | 2014-237297 | 12/2014 |
| JP | 2015005855 A | 1/2015 |

OTHER PUBLICATIONS

Japanese Office Action 2015-035823.

* cited by examiner

*Primary Examiner* — Gabriel Garcia
(74) *Attorney, Agent, or Firm* — Duft Bornsen & Fettig LLP

(57) ABSTRACT

A non-transitory recording medium has a program recorded therein that is executable by a computer. The program causes the computer to implement functions of a preview image generation condition creation unit configured to create a condition for generating a preview image, a determination unit configured to determine whether a preview image of output data should be generated based on the condition for generating the preview image and attribution information of the output data, the output data being stored in an output data storage unit, and a preview image generation unit configured to generate the preview image of the output data which is determined that the preview image of the output data should be generated.

11 Claims, 13 Drawing Sheets

FIG.4

SETTING FOR CONDITION DEFINITION FILE

| OUTPUT DESTINATION GROUP | STATUS | PROCESS RESULT | JOB ATTRIBUTE | TIME STAMP | BACKUP FOLDER... |
|---|---|---|---|---|---|
| ALL | OUTPUT IS HELD, OUTPUT... | ALL | *,*,*,*,*,* | 0 | |
| GROUP1 | OUTPUT IS HELD | ALL | *ABC,ABC*,*,*... | 0 | |
| ALL | OUTPUT IS HELD, OUTPUT... | ALL | *DEF,*DEF,*D... | 10 | |

1000

| NEWLY CREATE... | CHANGE... | DELETE... | OPEN... | STORE... | FINISH |
| 1001 | 1002 | 1003 | 1004 | 1005 | 1006 |

FIG.5

SETTING FOR CONDITION GROUP 1100

OUTPUT DESTINATION GROUP
- ⦿ ALL
- ○ INDIVIDUAL: [          ]

STATUS
- ☑ OUTPUT IS HELD
- ☑ OUTPUT PROCESS IS FINISHED

PROCESS RESULT
- ⦿ ALL
- ○ PRINTING IS COMPLETED

JOB ATTRIBUTE

| | | |
|---|---|---|
| JOB NAME: | * | AND |
| COMPUTER NAME: | * | AND |
| USER NAME: | * | AND |
| COOPERATION PORT: | * | AND |
| PRINTER OF OUTPUT DESTINATION: | * | AND |
| HOST ID: | * | AND |
| OUTPUT CLASS: | * | |

TIME STAMP
THE RELATIVE NUMBER OF DAYS: [ 0 ] DAYS BEFORE

BACKUP FOLDER NAME: [          ] [REFER...]

[ OK ]   [ CANCEL ]

FIG.6

SETTING FOR CONDITION GROUP  ⟶1200

OUTPUT DESTINATION GROUP
- ● ALL
- ○ INDIVIDUAL: _____

STATUS
- ☑ OUTPUT IS HELD
- ☑ OUTPUT PROCESS IS FINISHED

PROCESS RESULT
- ● ALL
- ○ PRINTING IS COMPLETED

JOB ATTRIBUTE

| | | |
|---|---|---|
| JOB NAME: | *DEF | AND |
| COMPUTER NAME: | *DEF | AND |
| USER NAME: | *DEF | AND |
| COOPERATION PORT: | *DEF | AND |
| PRINTER OF OUTPUT DESTINATION: | *DEF | AND |
| HOST ID: | *DEF | AND |
| OUTPUT CLASS: | *DEF | |

TIME STAMP
THE RELATIVE NUMBER OF DAYS: [ 10 ] DAYS BEFORE

BACKUP FOLDER NAME: _____ [REFER...]

[ OK ]   [ CANCEL ]

FIG.7

[SECTION]
KEY=VALUE

[Common]
VPGroupNum=2
[VP_Group_1]
VPName=All
JobStatusPend=1
JobStatus=1
JobStatusComp=0
JobAttrJobName=*
JobAttrPC=*
JobAttrUser=*
JobAttrIN=*
JobAttrPrn=*
JobAttrHID=*
JobAttrClass=*
JobTimeRecept=0
FolderPath=
[VP_Group_2]
VPName=GROUP1
JobStatusPend=1
JobStatus=0
JobStatusComp=0
JobAttrJobName=*ABC
JobAttrPC=ABC*
JobAttrUser=*
JobAttrIN=*
JobAttrPrn=*
JobAttrHID=*
JobAttrClass=*
JobTimeRecept=0
FolderPath=

FIG.8

| ID | JOB NAME | COMPUTER NAME | USER NAME | PRINTER NAME | CLASS | FILE PATH OF PRINT JOB | ... |
|---|---|---|---|---|---|---|---|
| 001 | ABCD | COM1 | USER1 | AP | C1 | C:¥···¥ABCD_001.dat | ... |
| 002 | EFGH | COM2 | USER2 | BP | C2 | C:¥···¥EFGH_002.dat | ... |
| 003 | ABCJ | COM1 | USER1 | AP | C3 | C:¥···¥ABCJ_003.dat | ... |
| ... | ... | ... | ... | ... | ... | ... | ... |

FIG.9A

| JOB NAME | COMPUTER NAME | USER NAME | PRINTER NAME | CLASS | ... |
|---|---|---|---|---|---|
| A* | * | USER1 | * | * | ... |

FIG.9B

| ID | JOB NAME | COMPUTER NAME | USER NAME | PRINTER NAME | CLASS | ... |
|---|---|---|---|---|---|---|
| 001 | ABCD | COM1 | USER1 | AP | C1 | ... |
| 002 | EFGH | COM2 | USER2 | BP | C2 | ... |
| 003 | ABCJ | COM1 | USER1 | AP | C3 | ... |
| ... | | | | | | .. |

PREVIEW IMAGE GENERATION FOR PRINTERS

CROSS-REFERENCE TO RELATED APPLICATION

The present application is based on and claims the benefit of priority of Japanese Priority Application No. 2015-035823 filed on Feb. 25, 2015, with the Japanese Patent Office, the entire contents of which are hereby incorporated by reference.

BACKGROUND OF THE INVENTION

1. Field of the Invention

The disclosures herein generally relate to a non-transitory recording medium, an information processing apparatus, and an information processing method.

2. Description of the Related Art

There are cases in which a user wants to confirm a print image of print data before performing actual printing on papers. For meeting the need of the user, print management software and an application which have a preview function are known in the art. Because it takes time to generate and display a preview image of a specified page every time a page is specified, a technique which has previously stored preview images of pages other than the specified page is known in the art.

Japanese Unexamined Patent Application Publication No. 2013-162422 discloses an image forming apparatus which displays a preview of relevance according to output forms between a plurality of pages when outputting images of the pages.

The image forming apparatus, which displays the preview of the relevance according to the output forms between the pages, analyzes the relevance based on setting information of print data, and generates a preview image including the pages having the relevance as a group.

The above described preview function generates the preview images of the pages other than the designated page, and reduces the time required for displaying the preview image in a case in which a preview image to be displayed has been generated. Thus, the above described preview function can increase preview images whose times required for displaying are short by having generated many preview images previously.

However, having generated many preview images previously makes a processing load and a volume load larger. Further, it is a waste to generate and store the preview images not to be displayed.

SUMMARY OF THE INVENTION

It is a general object of at least one embodiment of the present invention to provide a non-transitory recording medium, an information processing apparatus, and an information processing method that substantially obviate one or more problems caused by the limitations and disadvantages of the related art.

An embodiment of the present invention provides a non-transitory recording medium having a program recorded therein that is executable by a computer, the program when executed causing the computer to implement functions of a preview image generation condition creation unit configured to create a condition for generating a preview image; a determination unit configured to determine whether a preview image of output data should be generated based on the condition for generating the preview image and attribution information of the output data, the output data being stored in an output data storage unit; and a preview image generation unit configured to generate the preview image of the output data which is determined that the preview image of the output data should be generated.

An embodiment of the present invention also provides an information processing apparatus including a preview image generation condition creation unit configured to create a condition for generating a preview image; a determination unit configured to determine whether a preview image of output data should be generated based on the condition for generating the preview image and attribution information of the output data, the output data being stored in an output data storage unit; and a preview image generation unit configured to generate the preview image of the output data which is determined that the preview image of the output data should be generated.

An embodiment of the present invention also provides an information processing method including a step of creating a condition for generating a preview image; a step of determining whether a preview image of output data should be generated based on the condition for generating the preview image and attribution information of the output data, the output data being stored in an output data storage unit; and a step of generating the preview image of the output data which is determined that the preview image of the output data should be generated.

BRIEF DESCRIPTION OF THE DRAWINGS

FIG. 4 is a conceptual diagram illustrating an example of a preview image generation condition list screen;

FIG. 5 is a conceptual diagram illustrating an example of a preview image generation condition setting screen in a case in which a new creation button is pushed;

FIG. 6 is a conceptual diagram illustrating an example of a preview image generation condition setting screen in a case in which a change button is pushed;

FIG. 7 is a configuration diagram illustrating an example of a file which stores the generation condition of the preview image;

FIG. 8 is a table illustrating examples of attribute information associated with print jobs;

FIG. 9A is a table illustrating an example of a generation condition of a preview image;

FIG. 9B is a table illustrating examples of the attribute information associated with the print jobs;

DESCRIPTION OF THE PREFERRED EMBODIMENTS

In the following, embodiments of the present invention will be described with reference to the accompanying drawings.

It should be noted that although a print system will be described below as an example of an embodiment of an output system, the present invention is not limited to this. The output system may be an output system in which an output result of electronic data is displayed as a preview image and the user can confirm the preview image.

<First Embodiment>
<System Configuration>

Figure 1:
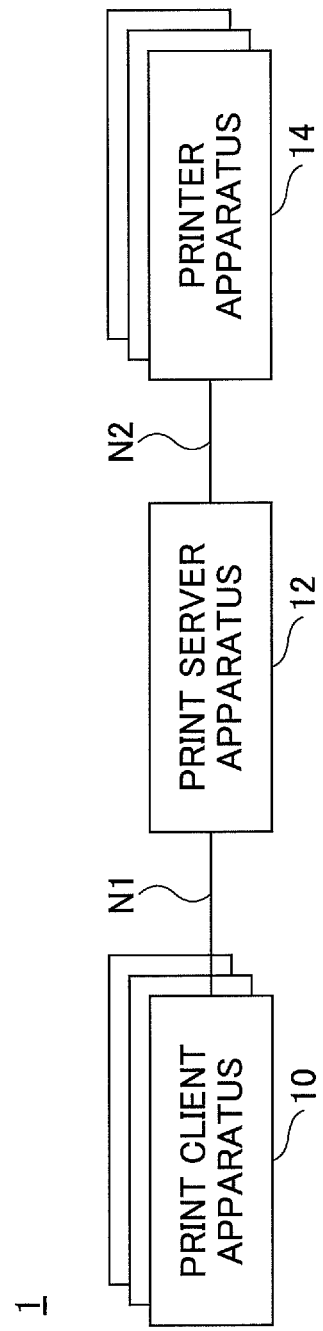
FIG. 1 is a block diagram illustrating an example of a configuration of a print system according to a first embodiment.

FIG. 1 is a block diagram illustrating an example of a configuration of a print system 1 according to a first embodiment. The print system 1 includes one or more print client apparatuses 10, a print server apparatus 12, and one or more printer apparatuses 14.

The print server apparatus 12 is connected to the client apparatuses 10 via a network N1 such as the local area network (LAN). Further, the print server apparatus 12 is connected to the print apparatuses 14 via a network N2 such as the local area network (LAN).

The print client apparatus 10 is an information processing apparatus which is used by a user. The print client apparatus 10 may be a terminal apparatus such as a smartphone, a mobile phone, and a personal computer (PC). The print server apparatus 12 is an information processing apparatus which performs management of printing. Further, the print server apparatus 12 may be an information processing apparatus which is used by the user.

The printer apparatus 14 is an apparatus which transfers (prints) print data on a paper. It should be noted that the printer apparatus 14 may be a copy machine, a multifunction peripheral, or the like which includes two or more functions such as a copying function, a scanning function, a facsimile function, and the like. It should be noted that a configuration of the print system 1 shown in FIG. 1 is an example and the print system 1 may have another configuration. For example, in the print system 1 shown in FIG. 1, the print server apparatus 12 may include a plurality of information apparatuses.

<Hardware Configuration>

Figure 2:
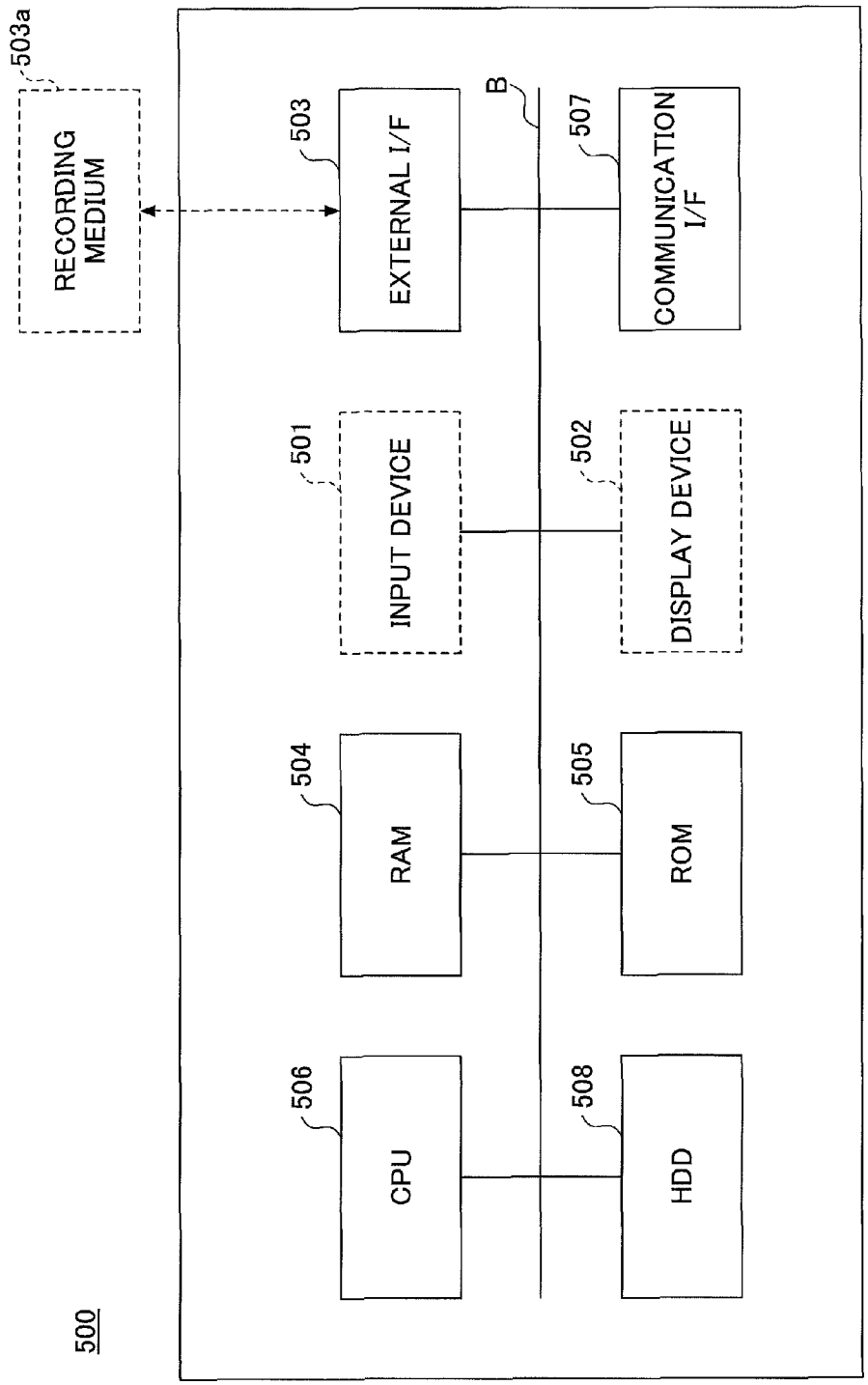
FIG. 2 is a block diagram illustrating an example of a hardware configuration of a computer according to the first embodiment.

The print client apparatus 10 and the print server apparatus 12 shown in FIG. 1 may be implemented by a computer having a hardware configuration as shown in FIG. 2, for example. FIG. 2 is a block diagram illustrating an example of a hardware configuration of a computer 500.

In FIG. 2, the computer 500 includes an input device 501, a display device 502, an external I/F 503, a RAM 504, a ROM 505, a CPU 506, a communication I/F 507, and a hard disk drive (HDD) 508 that are interconnected via a bus B. It should be noted that in some embodiments, the input device 501 and the display device 502 may be connected to the computer 500 when they need to be used.

The input device 501 includes a keyboard, a mouse, a touch panel, and the like. The input device 501 is used for inputting various operation signals by the user. The display device 502 includes a display and the like. The display device 502 displays processing results of the computer 500.

The communication I/F 507 is an interface for connecting the computer 500 to the networks N1 and N2. In this way, the computer 500 may perform data communication with other computers via the communication I/F 507.

The HDD 508 is an example of a nonvolatile storage device storing programs and data. The programs and the data stored in the HDD 508 may include an operating system (OS) which is basic software and controls overall operations of the computer 500, application software (referred to as the application hereinafter) which provides various functions under the control of the OS, and the like. It should be noted that the computer 500 may use a drive apparatus (for example, a solid state drive (SSD)) which uses a flash memory as a storage medium instead of the HDD 508.

The external I/F 503 is an interface between the computer 500 and an external device. The external device may be a recording medium 503a, or the like. Thus, the computer 500 may read from and/or write on the storage medium 503a via the external I/F 503. The storage medium 503a may be a flexible disk, a compact disk (CD), a digital versatile disk (DVD), an SD memory card, a universal serial bus (USB) memory, or the like.

The ROM 505 is an example of a nonvolatile semiconductor memory (storage device) which can store programs and/or data even when the power is turned off. The ROM 505 stores programs and data such as a basic input/output system (BIOS) to be executed when the computer 500 is started, OS settings, network settings, and the like. The RAM 504 is an example of a volatile semiconductor memory (storage device) which temporarily stores programs and/or data.

The CPU 506 includes an arithmetic and logic unit which reads a program and/or data from a storage device such as the ROM 505 and/or the HDD 508, loads the program and/or the data in the RAM 504, and executes processes according to the program and/or the data in order to control the overall operations and functions of the computer 500. The print client apparatus 10 and the print server apparatus 12 of the first embodiment may implement various processes as described below using the above described hardware configuration of the computer 500.

<Software Configuration>
<Print Server Apparatus>

Figure 3:
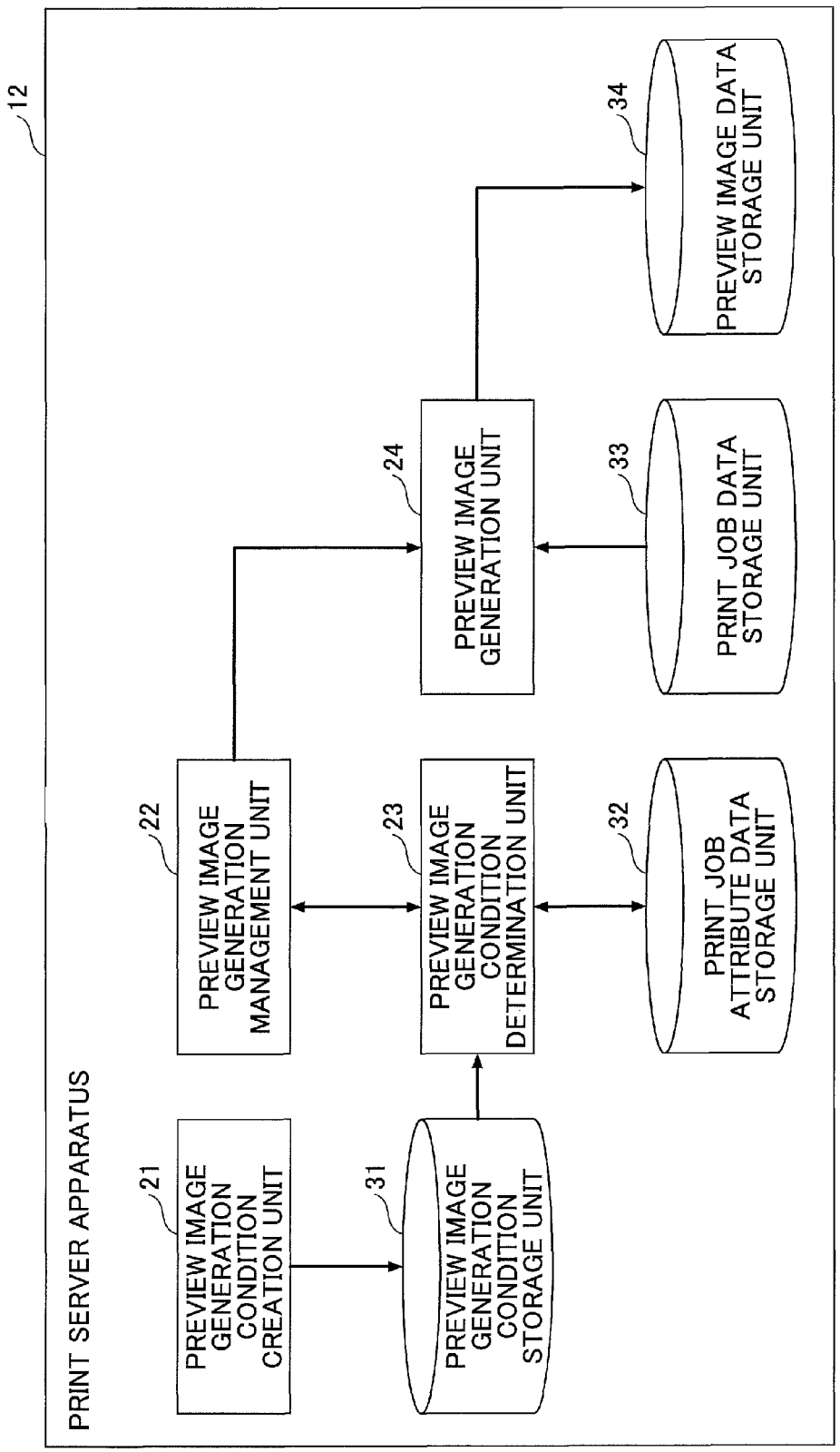
FIG. 3 is a block diagram illustrating an example of a functional configuration of a print server apparatus according to the first embodiment.

The print server apparatus 12 according to the first embodiment may be implemented by a functional configuration (process block) shown in FIG. 3, for example. FIG. 3 is a block diagram illustrating an example of a functional configuration (process block) of the print server apparatus 12 according to the first embodiment. Among functional configurations of the print server apparatus 12, required parts for describing the embodiment are shown in FIG. 3.

The print server apparatus 12 implements a preview image generation condition creation unit 21, a preview image generation management unit 22, a preview image generation condition determination unit 23, a preview image generation unit 24, a preview image generation condition storage unit 31, a print job attribute data storage unit 32, a print job data storage unit 33, and a preview image data storage unit 34 by executing programs.

The preview image generation condition creation unit 21 receives input from the user in order to create a generation condition of a preview image (condition for generating the preview image). The generation condition of the preview image is a condition for determining (extracting), from printing jobs, a print job(s) which is an object for generating the preview image. The preview image generation condition creation unit 21 stores the created generation condition of the preview image in the preview image generation condition storage unit 31.

The preview image generation management unit 22 is activated (started) in response to a user operation, a reception of the print job, arrival of designated time, passing of designated time period, control by a task manager, a creation of the generation condition of the preview image, control by the preview image generation condition creation unit 21 or the like. The preview image generation management unit 22 performs execution control of the preview image generation condition determination unit 23 and the preview image generation unit 24. In other words, the preview image generation management unit 22 manages start timing of processes of the preview image generation condition determination unit 23 and the preview image generation unit 24.

The preview image generation management unit 22 activates the preview image generation condition determination unit 23 when the preview image generation management unit 22 is activated. The preview image generation condition determination unit 23 reads out the generation condition of the preview image from the preview image generation condition storage unit 31 in order to recognize the condition with respect to attribute information of the print job which is the object for generating the preview image.

The preview image generation condition determination unit 23 obtains a list of the print job(s) and the attribute information associated with the print job with reference to the attribute information of the print job(s) stored in the print job attribute data storage unit 32. It should be noted that the preview image generation condition determination unit 23 may obtain all the attribute information associated with the print job or obtain the attribute information designated in the generation condition of the preview image.

The attribute information of the print job stored in the print job attribute data storage unit 32 and the print job stored in the print job data storage unit 33 are associated with each other. Thus, each of the print jobs has the associated attribute information.

Using the generation condition of the preview image, the preview image generation condition determination unit 23 specifies aggregation (group) of the print jobs which is the object of the generation of the preview image (or not the object of the generation of the preview image) based on the attribute information associated with each of the print jobs. In other words, the preview image generation condition determination unit 23 determines whether the preview image of the print data should be generated based on the generation condition for generating the preview image and attribution information of the print data. It should be noted that the number of the print jobs, which are the objects of the generation of the preview image, may be one or more, or 0.

The preview image generation condition determination unit 23 responds (transmits) the specified aggregation information of the print jobs to the preview image generation management unit 22. In response to receiving the specified aggregation information of the print jobs from the preview image generation condition determination unit 23, the preview image generation management unit 22 requests the preview image generation unit 24 to perform a generation process of the preview image of the print jobs which are the objects of the generation of the preview image.

The preview image generation unit 24 obtains, from the print job data storage unit 33, the print job data of the print job(s) which is the object of the generation of the preview image. The preview image generation unit 24 generates the preview image data from the obtained print job data in order to store the generated preview image data in the preview image storage unit 34.

<Details of Process>

In the following, details of processes of the print system 1 according to the first embodiment will be described.

<<Creation Process of Generation Condition of Preview Image>>

For example, the preview image generation condition creation unit 21 causes the user to designate the attribute information of the generation condition of the preview image from a graphical user interface (GUI). For example, the preview image generation condition creation unit 21 may display a list of the generation conditions of the preview image being created as shown in FIG. 4.

FIG. 4 is a conceptual diagram illustrating an example of a preview image generation condition list screen 1000. The preview image generation condition list screen 1000 displays names of items of the attribute information in the first row. Further, each row after the first row (that is, the second row to the fourth row in FIG. 4) is one of the generation conditions of the preview image in the preview image generation condition list screen 1000. As shown in the preview image generation condition list screen 1000, the user can create the generation conditions of the preview image in a plurality of rows. The generation conditions of the preview image may be shared by a plurality of users or may be created for each of the users.

In the preview image generation condition list screen 1000, a new creation button 1001, a change button 1002, a delete button 1003, an open button 1004, a store button 1005, and a finish button 1006 are arranged.

In response to pushing of the new creation button 1001, the preview image generation condition creation unit 21 displays a preview image generation condition setting screen 1100 as shown in FIG. 5. FIG. 5 is a conceptual diagram illustrating an example of a preview image generation condition setting screen 1100 in a case in which the new creation button 1001 is pushed. In the preview image generation condition setting screen 1100, a condition with respect to each of the attribute information items of the print job can be set.

It should be noted that in a case in which the condition is a character string, a regular expression can be used such as matching in a front part, matching in a back part, and a partial match. For example, when "ABC*" is designated in the job name, print job(s) whose name matches "ABC" in the front part can be the object(s) of the generation of the preview image.

In response to an event in which the change button 1002 is pushed in a state in which one of the second row to the fourth row of the generation conditions of the preview image is selected in the preview image generation condition list screen 1000 shown in FIG. 4, the preview image generation condition creation unit 21 displays a preview image generation condition setting screen 1200 as shown in FIG. 6. FIG. 6 is a conceptual diagram illustrating an example of a preview image generation condition setting screen 1200 in a case in which the change button 1002 is pushed. The preview image generation condition setting screen 1200 is displayed in a state in which values of the condition, which have been set previously, are set. The user can change the values of the condition, which have been set previously, from the preview image generation condition setting screen 1200.

Further, in response to an event in which the delete button 1003 is pushed in a state in which one of the second row to the fourth row of the generation conditions of the preview image is selected in the preview image generation condition list screen 1000 shown in FIG. 4, the preview image generation condition creation unit 21 deletes the generation condition of the preview image being (having been) selected.

Further, in response to an event in which the store button 1005 is pushed in the preview image generation condition list screen 1000 shown in FIG. 4, the preview image generation condition creation unit 21 stores the generation condition of the preview image being (having been) set as an arbitrary file name. Further, in response to an event in which the open button 1004 is pushed in the preview image generation condition list screen 1000 shown in FIG. 4, the preview image generation condition creation unit 21 reads out the generation condition of the preview image stored as the arbitrary file name. Further, in response to an event in which the finish button 1006 or the x button at the upper right is pushed in the preview image generation condition list screen 1000 shown in FIG. 4, the preview image generation condition creation unit 21 finishes the creation process of the generation condition of the preview image.

The file for storing the generation condition of the preview image may be a file in which the generation condition of the preview image is described. For example, the file may be stored in a format shown in FIG. 7. FIG. 7 is a configuration diagram illustrating an example of the file which stores the generation condition of the preview image. It should be noted that the generation condition of the preview image may be stored on a memory.

<<Management Process of Generation Condition of Preview Image>>

The preview image generation management unit 22 may be a command type program and, for example, implemented by the following command specification.
<command specification>
command name. exe -f name of preview image generation condition
option description:
-f name of preview image generation condition designate name of preview image generation condition.

The preview image generation management unit 22 can obtain and specify one generation condition of the preview image among the generation conditions of the preview image by receiving a name of the generation condition of the preview image as a command argument. The preview image generation management unit 22 instructs the preview image generation condition determination unit 23 to determine the print job(s) which is the object of the generation of the preview image while designating the obtained generation condition of the preview image.

Further, for example, the preview image generation management unit 22 may be implemented by the following command specification. In the following command specification, by enabling to designate previously a range of pages of the print job, which is the object for generating the preview image, the generation of the preview image of unnecessary pages can be omitted and the generation process of the preview image can be streamlined. The preview image generation unit 24 generates the preview images of the designated range of the pages. It should be noted that the designation of the range of pages of the print job, which is the object of the generation of the preview image, can be set uniquely corresponding to the generation condition of the preview image.
<command specification>
command name. exe -f name of preview image generation condition -p start page from which preview image is generated, end page to which preview image is generated
option description:
-f name of preview image generation condition designate name of preview image generation condition
-p start page from which preview image is generated, end page to which preview image is generated designate start page and end page.

The preview image generation management unit 22 instructs the preview image generation condition determination unit 23 to determine the print job(s) which is the object of the generation of the preview image while designating the obtained preview image generation condition. The preview image generation management unit 22 can specify the pages, which are the object of the preview image, of the print job which match the generation condition of the preview image based on a start page and an end page.

<<Determination Process of Generation Condition of Preview Image>>

The preview image generation condition determination unit 23 obtains, from the print job attribute data storage unit 32, the attribute information associated with the print job. FIG. 8 is a configuration diagram (table) illustrating examples of the attribute information associated with the print jobs. As shown in FIG. 8, the attribute information is stored in association with the print job by "job name".

The attribute information shown in FIG. 8 includes information such as a computer name of the print client apparatus 10 which has made a print request, a user name of a user who has made the print request, a printer name of the printer apparatus 14 which performs the printing, a class, and a file path of the print job.

It should be noted that the preview image generation condition determination unit 23 may obtain, from the print job attribute data storage unit 32, only column(s) necessary for determination or all the columns. For example, the preview image generation condition determination unit 23 holds (expands) the designated generation condition of the preview image and the attribute information associated with the print job and obtained from the print job attribute data storage unit 32 as shown in FIGS. 9A and 9B.

FIG. 9A is a configuration diagram (table) illustrating an example of the generation condition of the preview image. FIG. 9B is a configuration diagram (table) illustrating examples of the attribute information associated with the print job. The preview image generation condition determination unit 23 compares the generation condition of the preview image shown in FIG. 9A with the attribute information associated with the print jobs shown in FIG. 9B in order to specify the aggregation of the print jobs, which is the object of the generation of the preview image as follows.

The preview image generation condition determination unit 23 performs comparison determination from the first row of the attribute information in order. For example, at first, the preview image generation condition determination unit 23 compares the job name of the generation condition of the preview image with the job name of the print job whose ID is "001". In the examples shown in FIGS. 9A and 9B, because the attribute information whose IDs are "001" and "0003" are matching the generation condition of the preview image, the print jobs which correspond to the attribute information, whose IDs are "001" and "0003", are specified as the objects of the generation of the preview image.

Figure 10:
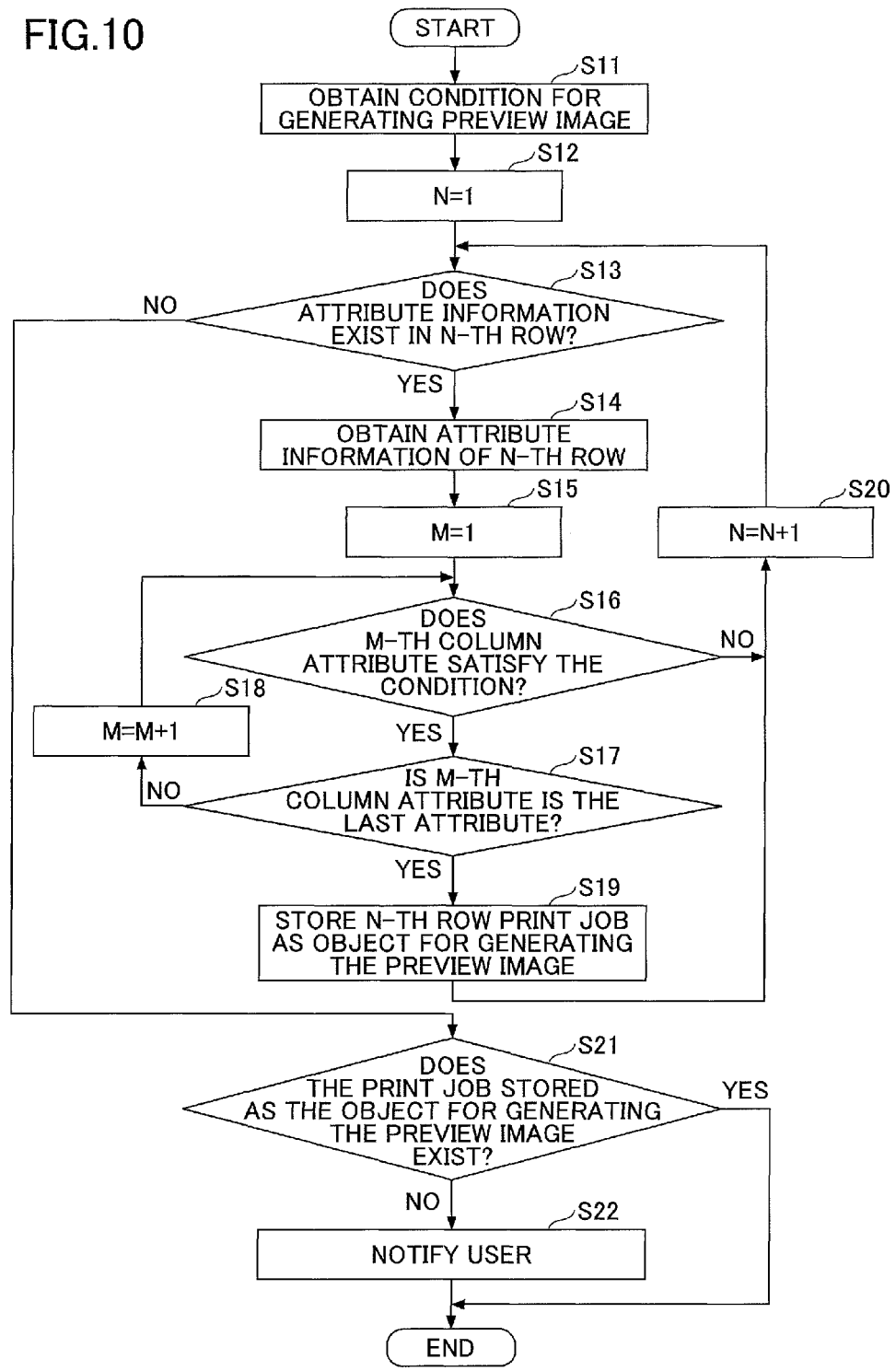
FIG. 10 is a flowchart illustrating an example of a determination process of the generation condition of the preview image.

FIG. 10 is a flowchart illustrating an example of the determination process of the generation condition of the preview image. In step S11, the preview image generation condition determination unit 23 obtains the generation condition of the preview image from the preview image generation condition storage unit 31. In step S12, the preview image generation condition determination unit 23 substitutes "1" for N.

In step S13, the preview image generation condition determination unit 23 determines whether the attribute information exits in N-th row. In a case in which the attribute information exits in N-th row (YES in step S13), the process goes to step S14 and the preview image generation condition determination unit 23 obtains the attribute information of N-th row. In step S15, the preview image generation condition determination unit 23 substitutes "1" for M.

In step S16, the preview image generation condition determination unit 23 determines whether M-th column attribute of the attribute information of N-th row obtained in step S14 satisfies the attribute of the generation condition of the preview image. In a case in which M-th column attribute of the attribute information of N-th row satisfies the attribute of the preview image generation condition (YES in step S16), the process goes to step S17.

In step S17, the preview image generation condition determination unit 23 determines whether M-th column attribute is the last attribute. In a case in which M-th column attribute is not the last attribute (NO in step S17), the preview image generation condition determination unit 23 increments M by one and the process goes to step S16. Then, the preview image generation condition determination unit 23 determines whether next (M+1-th column) attribute satisfies the attribute of the generation condition of the preview image.

In a case in which all the attributes satisfy the attribute of the generation condition of the preview image (from the first column attribute to the last column attribute), the preview image generation condition determination unit 23 stores the print job associated with the attribute information of N-th row obtained in step S14 as the object of the generation of the preview image in step S19. After that, the preview image generation condition determination unit 23 increment N by one in step S20 and the process goes to step S13. Then, the preview image generation condition determination unit 23 determines whether next attribute information (attribute of N+1-th row) exists. In a case in which the next attribute information exists (YES in step S13), the process goes to step S14 and the above described process is performed.

On the other hand, in a case in which the next attribute information does not exist (NO in step S13), the process goes to step S21 and the preview image generation condition determination unit 23 determines whether the print job stored as the object for generating the preview image exists in step S21. In a case in which there is no print jobs stored as the object for generating the preview image (NO in step S21), the process goes to step S22, and the preview image generation condition determination unit 23 notifies the user of information which indicates that there is no print jobs stored as the objects for generating the preview image.

The notification to the user may be performed, for example, by sending an email or displaying information on the display device 502 of the print server apparatus 12 or the client apparatus 10, or the printer apparatus 14. It should be noted that even one print job is stored as the object of the generation of the preview image (NO in step S21), the preview image generation condition determination unit 23 skips the process in step S22.

After having finished the determination process of the generation condition of the preview image, the preview image generation condition determination unit 23 notifies the preview image generation management unit 22 of the aggregation information (such as the IDs of the print jobs) of the print jobs stored as the object of the generation of the preview image. As shown in FIG. 10, the preview image generation condition determination unit 23 can specify the aggregation of the print jobs which is the object for generating the preview image and notify the preview image generation management unit 22 of the aggregation.

<<Generation Process of Preview Image>>

In response to the notification of the aggregation information of the print jobs which should be the objects of the generation of the preview image, the preview image generation management unit 22 requests the preview image generation unit 24 to perform a generation process of the preview image while designating the aggregation information of the print jobs which is the object for generating the preview image.

The preview image generation unit 24 obtains, from the print job data storage unit 33, the print job data which is the object for generating the preview image. The preview image generation unit 24 generates the preview image data based on the obtained the print job data in order to store the preview image data in the preview image storage unit 34.

When the preview image is displayed, the print server apparatus 12 determines whether corresponding preview image data is stored in the preview image storage unit 34. In a case in which the corresponding preview image data is stored in the preview image storage unit 34, the print server apparatus 12 displays the preview image using the preview image data stored in the preview image storage unit 34.

In a case in which the corresponding preview image data is not stored in the preview image storage unit 34, the print server apparatus 12 generates the preview image data in order to display the preview image. In other words, the first embodiment performs (starts) the determination process of the generation condition for generating the preview image in order to generate the preview image before receiving a request for displaying the preview image. As a result, the preview image(s) of print data which satisfies the generation condition for generating the preview image has been generated previously, and the preview image(s) of print data which does not satisfy the generation condition for generating the preview image has not been generated previously. It should be noted that the preview image(s) of print data which does not satisfy the generation condition for generating the preview image may be generated in response to the request for displaying the preview image (after receiving the request). Thus, the print server apparatus 12 reduces the time required for displaying the preview image because the data of the preview image has been generated previously in the case in which the print job of the preview image to be displayed is the object of the generation of the preview image.

<Summary>

According to the above described embodiment, the preview image of the print job which matches the generation condition of the preview image has been generated previously by determining (defining) the print job which is the object of the generation of the preview image based on the generation condition of the preview image.

Thus, the print system of first embodiment can reduce a processing load and a volume load in comparison with a print system which has generated preview images of all of the print jobs previously because the print system of first embodiment can narrow down (select) the print jobs whose preview images have been generated previously. Further, according to the first embodiment, the generation condition of the preview image may be determined (defined) such that print jobs whose preview images are likely to be displayed are specified as the objects of the generation of the preview image.

It should be noted that although the user defines (creates) the generation condition of the preview image in the first embodiment, the present invention is not limited to this. For example, the generation condition of the preview image may be generated automatically, by analyzing the attribute information of print jobs whose preview images have been displayed frequently based on history information.

Further, the user may define the generation condition of the preview image for the print jobs whose preview images are likely to be displayed or define the generation condition of the preview image which corresponds to print jobs whose preview images are to be displayed from now on.

<Second Embodiment>

A second embodiment differs from the first embodiment in that the print server apparatus 12 omits the preview image generation management unit 22 in the second embodiment. It should be noted that differences between the second embodiment and the first embodiment will be described because the second embodiment has configurations similar to the configurations of the first embodiment except for the differences.

Figure 11:
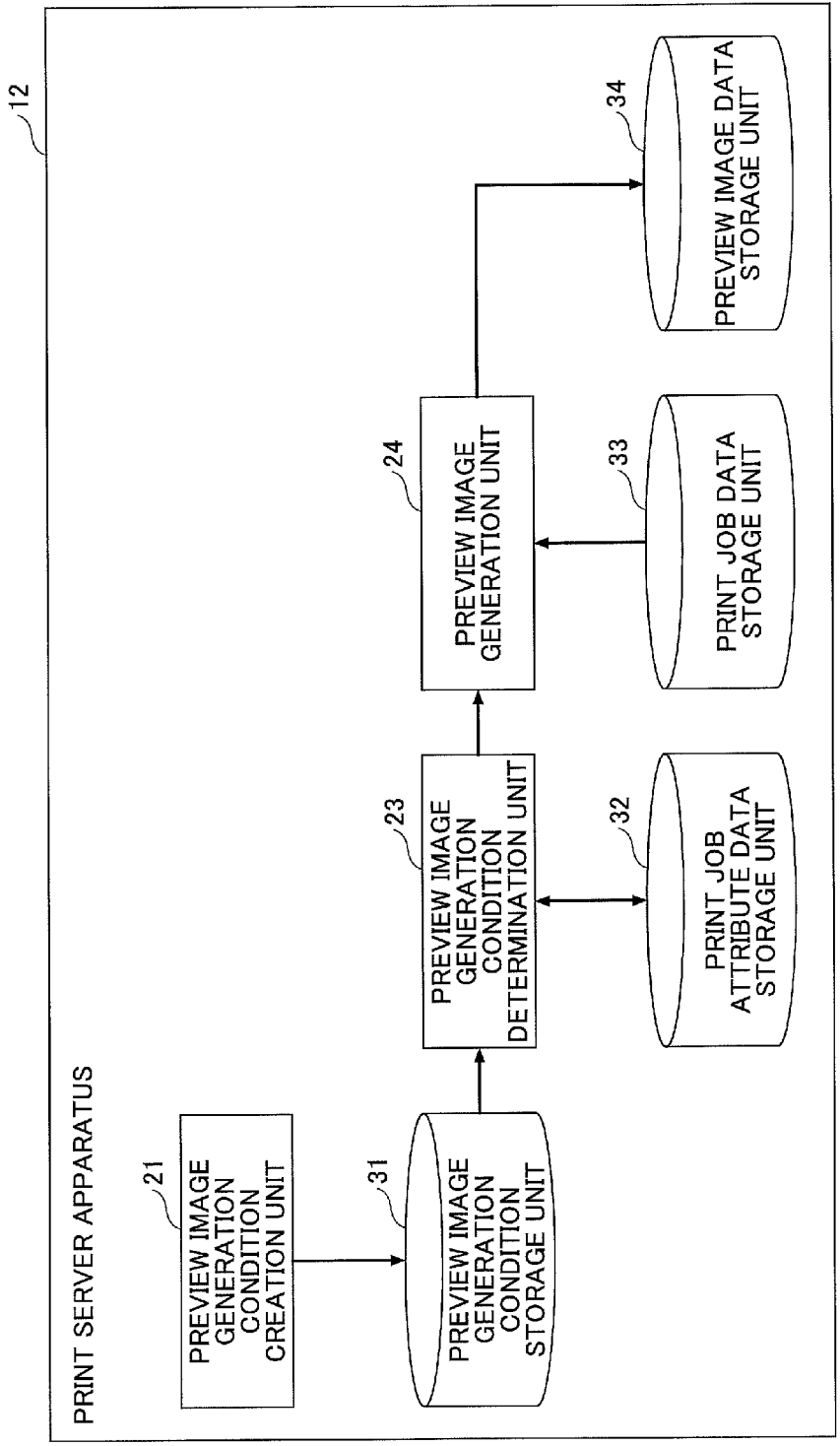
FIG. 11 is a block diagram illustrating an example of a functional configuration of the print server apparatus according to a second embodiment.

The print server apparatus 12 according to the second embodiment may be implemented by a functional configuration (process block) shown in FIG. 11, for example. FIG. 11 is a block diagram illustrating an example of a functional configuration (process block) of the print server apparatus 12 according to the second embodiment. The functional configuration shown in FIG. 11 omits the preview image generation management unit 22 from the functional configuration of the print server apparatus 12 shown in FIG. 3.

The preview image generation condition determination unit 23 is activated (started) in response to the user operation, the reception of the print job, arrival of designated time, passing of designated time period, the control by the task manager, the creation of the generation condition of the preview image, the control by the preview image generation condition creation unit 21 or the like.

The preview image generation condition determination unit 23 notifies the preview image generation unit 24 of the specified aggregation information of the print jobs, and requests the preview image generation unit 24 to perform the generation process of the preview image of the print jobs which should be the objects of the generation of the preview image. The print server apparatus 12 according to the second embodiment can obtain effect similar to the effect according to the print server apparatus 12 of the first embodiment.

<Third Embodiment>

Figure 12:
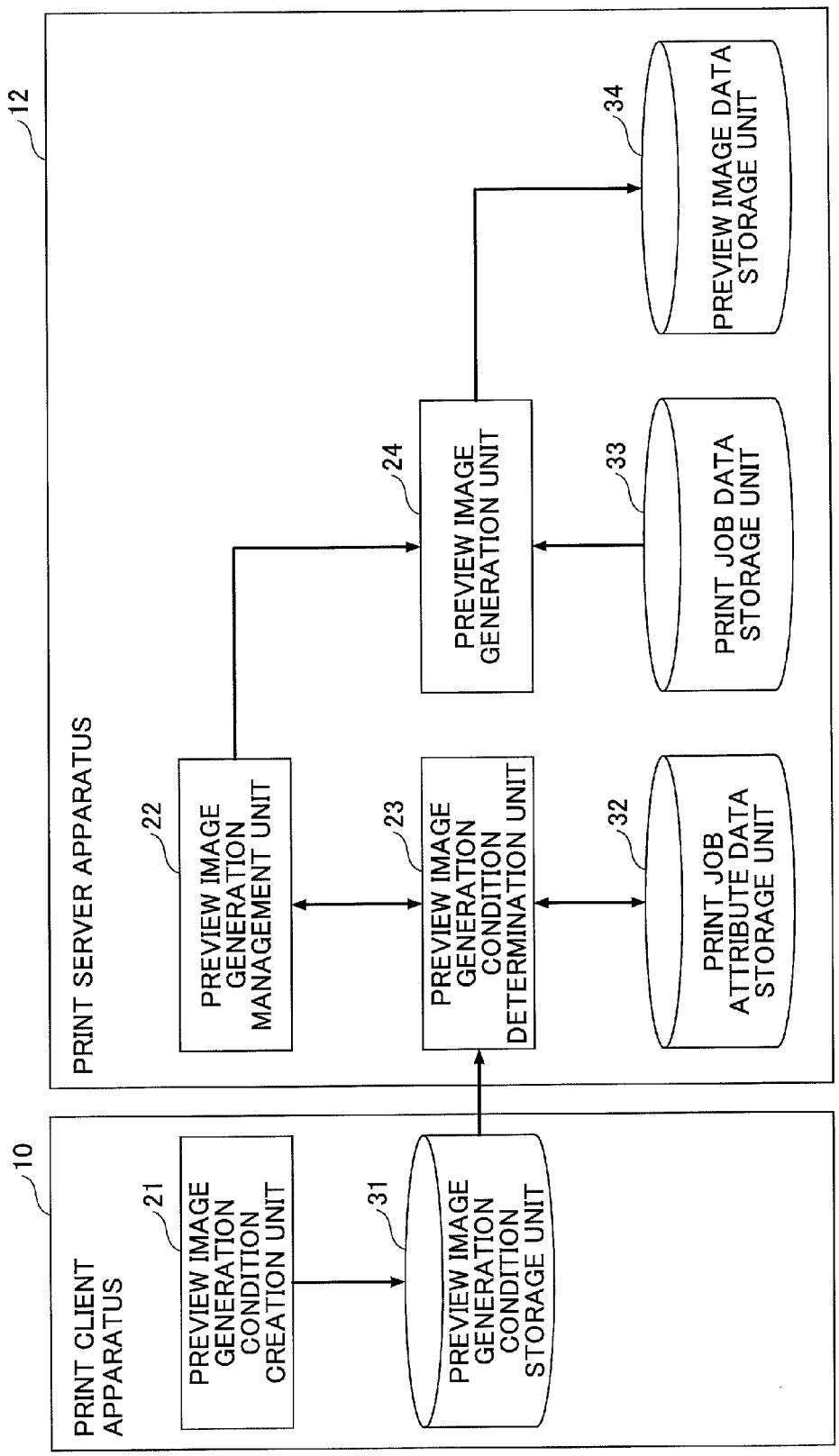
FIG. 12 is a block diagram illustrating an example of a functional configuration of the print system according to a third embodiment.
Figure 13:
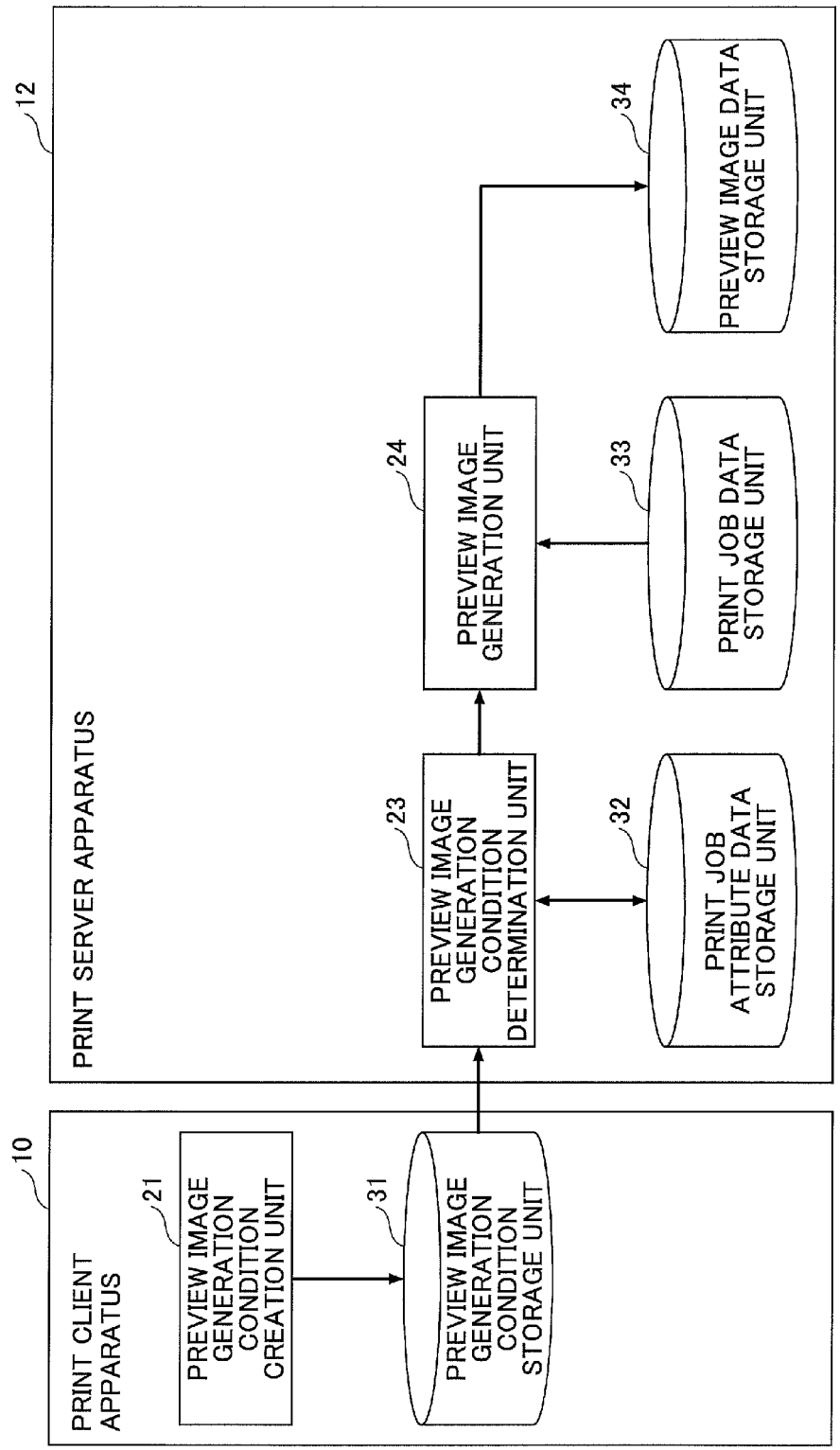
FIG. 13 is a block diagram illustrating an example of a functional configuration of the print system according to a fourth third embodiment.

Parts of the functional configuration (process block) of the print server apparatus 12 according to the first and second embodiment may be arranged in the print client apparatus 10 as shown in FIG. 12 and FIG. 13. FIG. 12 is a block diagram illustrating an example of a functional configuration (process block) of the print system 1 according to the third embodiment.

The functional configuration shown in FIG. 12 differs from the first embodiment in that the preview image generation condition creation unit 21 and the preview image generation condition storage unit 31 are arranged in the print client apparatus 10 in the third embodiment. Because other elements of the third embodiment are similar to the elements of the first embodiment, their descriptions will be omitted as appropriate.

It should be noted that although FIG. 12 shows the example in which the preview image generation condition creation unit 21 and the preview image generation condition storage unit 31 are arranged in the print client apparatus 10, the present invention is not limited to this. The preview image generation condition creation unit 21 and the preview image generation condition storage unit 31 may be arranged in another apparatus other than the print client apparatus 10. Further, the preview image generation condition storage unit 31, shown in the print client apparatus 10 of FIG. 12, may be arranged in the print server apparatus 12.

<Fourth Embodiment>

FIG. 13 is a block diagram illustrating an example of a functional configuration (process block) of the print system 1 according to a fourth third embodiment. The functional configuration shown in FIG. 13 differs from the second embodiment in that the preview image generation condition creation unit 21 and the preview image generation condition storage unit 31 are arranged in the print client apparatus 10 in the fourth embodiment. Because other elements of the fourth embodiment are similar to the elements of the second embodiment, their descriptions will be omitted as appropriate.

It should be noted that although FIG. 13 shows the example in which the preview image generation condition creation unit 21 and the preview image generation condition storage unit 31 are arranged in the print client apparatus 10, the present invention is not limited to this. The preview image generation condition creation unit 21 and the preview image generation condition storage unit 31 may be arranged in another apparatus other than the print client apparatus 10. Further, the preview image generation condition storage unit 31 shown in the print client apparatus 10 of FIG. 13 may be arranged in the print server apparatus 12.

Further, the present invention is not limited to these embodiments, but various variations and modifications may be made without departing from the scope of the present invention.

It should be noted that the preview image generation condition creation unit 21 is an example of a preview image generation condition creation unit. The preview image generation condition determination unit 23 is an example of a determination unit. The preview image generation unit 24 is an example of a preview image generation unit. The preview image generation management unit 22 is an example of a preview image generation management unit.

The print client apparatus 10 is an example of a terminal apparatus. The print server apparatus 12 is an example of an information processing apparatus. The printer apparatus 14 is an example of an output apparatus. The print data is an example of output data. The print job data storage unit 33 is an example of an output data storage unit. A system which manages the printing from the printer apparatus 14 by using the print client apparatus 10 and the print server apparatus 12 is an example of an output management system.

What is claimed is:

1. A non-transitory recording medium having a program recorded therein that is executable by a computer, the program when executed causing the computer to implement functions of:

a preview image generation condition creation unit configured to create, as condition files, conditions for generating a preview image prior to printing, wherein a plurality of attribute information items are designated in each of the condition files;

a condition storage unit that stores the condition files;

a determination unit configured to select a condition file from the condition files stored in the storage condition unit, to compare attribute information items in the condition file to each of multiple print jobs in an output data storage unit, to identify print jobs that match attribute information items in the condition file based on the comparison, and to determine that preview images should be generated only for the identified print jobs; and a preview image generation unit configured to generate preview images only for the identified print jobs.

2. The non-transitory recording medium according to claim 1, wherein the determination unit is configured to determine that the preview images of the identified print jobs should be generated in a case in which all of the attribution information items of the identified print jobs satisfies the selected condition file.

3. The non-transitory recording medium according to claim 1, the functions further comprising:

a preview image generation management unit configured to manage start timing of a process of the determination unit and start timing of a process of the preview image generation unit.

4. The non-transitory recording medium according to claim 3, wherein the preview image generation management unit is configured to start the process of the determination unit and the process of the preview image generation unit in response to a user operation, reception of the output data, arrival of set time, or a creation of the condition for generating the preview image.

5. The non-transitory recording medium according to claim 3, wherein the preview image generation management unit is configured to receive designation of a range of pages whose preview images are to be created, and wherein the preview image generation unit is configured to generate the preview images of the range of the pages which is designated.

6. The non-transitory recording medium according to claim 3, wherein the preview image generation management unit is configured to start the process of the determination unit and the process of the preview image generation unit before receiving a request for displaying the preview image.

7. The non-transitory recording medium according to claim 6, wherein the preview image generation unit is configured not to generate preview images of a print job which does not satisfy the selected condition file, before receiving the request for displaying the preview image.

8. The non-transitory recording medium according to claim 7, wherein the preview image generation unit is configured to generate the preview images of the print job which does not satisfy the selected condition file, in response to the request for displaying the preview image.

9. The non-transitory recording medium according to claim 1, wherein the determination unit is configured to perform a process for notifying a user in a case in which the determination unit determines that there are no print jobs in the output data storage unit which satisfy the selected condition file for generating the preview image.

10. An information processing apparatus comprising:

a preview image generation condition creation unit configured to create, as condition files, conditions for generating a preview image prior to printing, wherein a plurality of attribute information items are designated in each of the condition files;

a condition storage unit that stores the condition files;

a determination unit configured to select a condition file from the condition files stored in the storage condition unit, to compare attribute information items in the condition file to each of multiple print jobs in an output data storage unit, to identify print jobs that match attribute information items in the condition file based on the comparison, and to determine that preview images should be generated only for the identified print jobs;

a preview image generation unit configured to generate preview images for only the identified print jobs.

11. An information processing method comprising:

creating, as condition files, conditions for generating a preview image to be generated prior to printing, wherein a plurality of attribute information items are designated in each of the condition files;

storing the condition files in a condition storage unit selecting a condition file from the condition files stored in the storage condition unit comparing attribute information items in the condition file to each of multiple print jobs in an output data storage unit;

identifying print jobs that match attribute information items in the condition file based on the comparison; and determining that preview images should be generated only for the identified print jobs; and generating preview images for only the identified print jobs.

* * * * *